United States Patent [19]

Lampen

[11] Patent Number: 5,375,257
[45] Date of Patent: Dec. 20, 1994

[54] MICROWAVE SWITCH

[75] Inventor: James L. Lampen, Medway, Mass.

[73] Assignee: Raytheon Company, Lexington, Mass.

[21] Appl. No.: 162,559

[22] Filed: Dec. 6, 1993

[51] Int. Cl.$^5$ .......................... H04B 1/44; H01P 1/15; H01P 5/18

[52] U.S. Cl. ...................................... 455/83; 333/109; 333/103; 455/277.1

[58] Field of Search ................ 333/101, 103, 104, 109, 333/113–116; 455/78, 80, 103, 83, 105, 272, 273, 277.1; 370/34, 32

[56] References Cited

U.S. PATENT DOCUMENTS

| | | | |
|---|---|---|---|
| 3,833,866 | 9/1974 | Boutelent | 333/116 X |
| 4,129,838 | 12/1978 | Wallington et al. | 333/104 |
| 4,254,385 | 3/1981 | Childs et al. | 333/104 |
| 4,556,808 | 12/1985 | Coats | 307/571 |
| 4,754,240 | 6/1988 | Marconi | 333/81 A |

OTHER PUBLICATIONS

"A High Power 2–18 GHz T/R Switch," M. H. Schindler, T. E. Kazior, Raytheon Company Research Division, IEEE 1990 Microwave and Millimeter–Monolithic Circuits Symposium, pp. 118–122.

"DC to 12–GHz SPDT Switch," Texas Instruments, Dallas, Tex., pp. 1–9, Copyright 1990, Texas instruments Incorporated.

"Simplifying the specs of PIN–diode switches," S. J. Algeri, R. Hicks, Watkins Johnson Co., Palo Alto, Calif., Microwaves & RF, Jul. 1986, pp. 83–91.

"Microwave Switching With GaAs FETs," Yalcin Ayasli, Raytheon Research Division, Microwave Journal, Nov. 1982, pp. 61–74.

*Primary Examiner*—Paul Gensler
*Attorney, Agent, or Firm*—Donald F. Mofford

[57] ABSTRACT

A transmit and receive module is described which provides means within the module for switching between two orthogonal linear polarization ports and right and left hand circular polarization ports for both transmission and reception while maintaining very low RF reflections from the module at antenna ports.

19 Claims, 3 Drawing Sheets

MICROWAVE SWITCH

BACKGROUND OF THE INVENTION

This invention relates to microwave switches and more particularly to a wideband switchable transmit/receive module.

As is known in the art, it is often desirable to connect a transmitter to a first antenna or alternatively connect the transmitter to a second antenna. In a similar manner, it is desirable to connect the second antenna to a receiver or alternatively connect the first antenna to the receiver. Typically, wideband circulators are employed to provide good impedance matching between the antennas and the transmitter and the receiver as well as to perform the duplexing function. Unfortunately, circulators can be quite large and in missile applications it is necessary to minimize space so that an alternative to circulators is desirable.

Wideband single pole multiple throw and transfer switches as well as cascaded single pole multiple throw (SPMT) switches have also been used to provide the antenna selection in addition to the duplexing (transmit/receive switching) function. A problem with the latter devices is that the amount of insertion loss provided by such devices can be great and for some applications may not be acceptable.

In missile applications, it is also desirable to minimize the radar cross section of the antenna and the missile. Devices that are coupled to the antenna must be properly matched to ensure RF energy is not reflected by the coupled device to the antenna and radiated.

SUMMARY OF THE INVENTION

With the foregoing background in mind, it is an object of this invention to provide a microwave switch having little insertion loss.

Another object of this invention is to provide a microwave switch having reduced size.

Still another object of this invention is to provide a module with means within the module for switching between two orthogonal linear polarization ports and right and left hand circular polarization ports for both transmission and reception while maintaining very low RF reflections from the module at antenna ports.

Still another object of this invention is to provide an improved wideband switchable transmit and receive module.

The foregoing and other objects of this inventions are met generally by a transmit and receive module, having a first pair of ports and a second pair of ports, for coupling signals fed to one of the first pair of ports to one of the second pair of ports and for coupling signals fed to another one of the second pair of ports to another one of the first pair of ports. The module includes a first quadrature hybrid coupler having a first, a second, a third and a fourth port, the first port being one of the first pair of ports of the transmit and receive module, and a second quadrature hybrid coupler having a first, a second, a third and a fourth port, the first port being another one of the first pair of ports of the transmit and receive module. The transmit and receive module further includes a third quadrature hybrid coupler having a first, a second, a third and a fourth port, the first port being one of the second pair of ports of the transmit and receive module and a fourth quadrature hybrid coupler having a first, a second, a third and a fourth port, the first port being another one of the second pair of ports of the transmit and receive module. The transmit and receive module still further includes a switching network, responsive to a control signal, for coupling the second and third port of the first quadrature hybrid coupler to the third and second port, respectively, of the third quadrature hybrid coupler and, alternatively, to the third and second port, respectively, of the fourth quadrature hybrid coupler and for coupling the second and third port of the second quadrature hybrid coupler to the third and second port, respectively, of the third quadrature hybrid coupler and, alternatively, to the third and second port, respectively, of the fourth quadrature hybrid coupler.

In accordance with another aspect of the present invention, the switching network includes a first switching means, having a first, a second, a third and a fourth port, for coupling the first port of the switching means to the second port of the switching means and the third port of the switching means to the fourth port of the switching means and, alternatively, for coupling the first port of the switching means to the fourth port of the switching means and the third port of the switching means to the second port of the switching means, the first port of the switching means coupled to the third port of the first quadrature hybrid coupler and a second switching means, having a first, a second, a third and a fourth port, for coupling the first port of the second switching means to the second port of the second switching means and the third port of the second switching means to the fourth port of the second switching means and, alternatively, for coupling the first port of the second switching means to the fourth port of the second switching means and the third port of the second switching means to the second port of the second switching means, the first port of the second switching means coupled to the second port of the first quadrature hybrid coupler. With such an arrangement, a technique for coupling signals between the first pair of ports and the second pair of ports of the transmit and receive module is provided.

In accordance with another aspect of the present invention, the switching network includes a first low noise amplifier disposed between the second port of the first switching means and the second port of the third quadrature hybrid coupler and a second low noise amplifier disposed between the second port of the second switching means and the third port of the third quadrature hybrid coupler. The switching network also includes a first power amplifier disposed between the fourth port of the first switching means and the second port of the fourth quadrature hybrid coupler and a second power amplifier disposed between the fourth port of the second switching means and the third port of the fourth quadrature hybrid coupler. With such an arrangement, signals propagating through the transmit and receive module are amplified and wherein the signals are divided, amplified and combined, the power handling capability of the module is increased.

BRIEF DESCRIPTION OF THE DRAWINGS

For a more complete understanding of this invention, reference is now made to the following description of the accompanying drawings, wherein.

DESCRIPTION OF THE PREFERRED EMBODIMENTS

Figure 1:
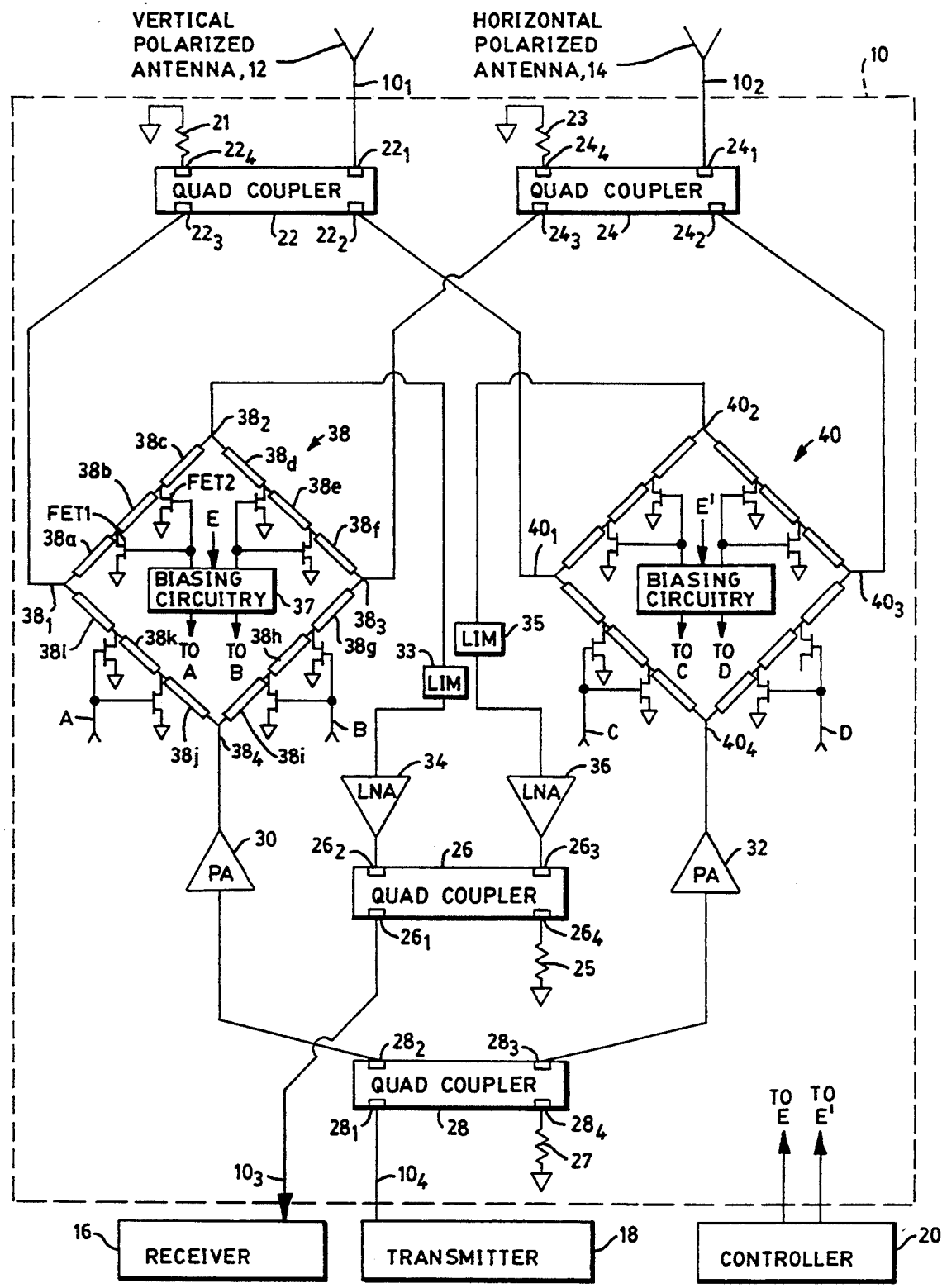
FIG. 1 is a block diagram of a transmit and receive module according to the invention.

Referring now to FIG. 1, it may be seen that a transmit and receive module 10 (hereinafter referred to as module 10) is shown to have four ports, port $10_1$, port $10_2$, port $10_3$ and port $10_4$. Here, in the contemplated configuration, port $10_1$ is connected to a vertical polarized antenna 12 and port $10_2$ is connected to a horizontal polarized antenna 14. The vertical polarized antenna 12 and the horizontal polarized antenna 14 can either be separate antennas or alternatively a common antenna with a vertical polarized feed and a horizontal polarized feed. Port $10_3$ is connected to a receiver 16 and port $10_4$ is connected to a transmitter 18. The module 10 is effective to connect the vertical polarized antenna 12 to the receiver 16 and the horizontal polarized antenna 14 to the transmitter 18 or, alternatively, connect the vertical polarized antenna 12 to the transmitter 18 and the horizontal polarized antenna 14 to the receiver 16.

The module 10 includes four quadrature hybrid couplers including coupler 22, coupler 24, coupler 26 and coupler 28. The module 10 further includes a power amplifier 30, a power amplifier 32, a limiter 33, a limiter 35, a low noise amplifier 34, a low noise amplifier 36, a switching network 38 and a switching network 40. The port $10_1$ is connected to a port $22_1$ of the coupler 22. The coupler 22, here a four port quadrature hybrid coupler, includes the port $22_1$ and a port $22_2$, a port $22_3$ and a port $22_4$. The coupler 22 is adapted to transfer entirely and equally, signals from the port $22_1$ to the ports $22_2$, $22_3$ and further adapted, alternatively, to combine and transfer signals from the ports $22_2$, $22_3$ to the port $22_1$. Thus, an RF signal fed to the port $22_1$ of the coupler 22 is equally split to the ports $22_2$, $22_3$ with one-half of the RF signal fed to the switching network 38 and one-half of the RF signal fed to the switching network 40 with the respective signals at the ports $22_2$, $22_3$ being 90 degrees out of phase with each other (i.e. in quadrature with each other).

It should be appreciated that if ports $22_2$ and $22_3$ are terminated with identical impedances, then any signal fed to port $22_1$ and coupled to ports $22_2$, $22_3$, if reflected by ports $22_2$, $22_3$ will constructively add at port $22_4$ and destructively add at port $22_1$. Thus, nearly all of the signal reflected from ports $22_2$, $22_3$ goes to port $22_4$ wherein a terminating resistor 21 is connected between the port $22_4$ and ground to terminate the reflected signal and almost none of the reflected signal goes back, via port $22_1$, to port $10_1$.

The port $22_3$ of the coupler 22 is connected to a first port $38_1$ of the switching network 38. The switching network 38 includes the port $38_1$, a port $38_2$, a port $38_3$ and a port $38_4$. The switching network 38, commonly referred to as a transfer switch, is effective in a first mode to connect the port $38_1$ with the port $38_2$ and the port $38_3$ with the port $38_4$ or, alternatively, in a second mode connect the port $38_1$ with the port $38_4$ and the port $38_3$ with the port $38_2$ as to be described further hereinafter. The port $38_2$ is connected, via the limiter 33, to an input of the low noise amplifier 34 having an output connected to a port $26_2$ of the coupler 26.

The port $22_2$ of the coupler 22 is connected to a first port $40_1$ of the switching network 40. The switching network 40 includes the port $40_1$, a port $40_2$, a port $40_3$ and a port $40_4$. The switching network 40, also commonly referred to as a transfer switch, is effective in a first mode to connect the port $40_1$ with the port $40_2$ and the port $40_3$ with the port $40_4$ or, alternatively, in a second mode connect the port $40_1$ with the port $40_4$ and the port $40_3$ with the port $40_2$ as to be described further hereinafter. The port $40_2$ is connected, via the limiter 35, to an input of the low noise amplifier 36 having an output connected to a port $26_3$ of the coupler 26.

The coupler 26, a four port quadrature hybrid coupler, includes a port $26_1$, the port $26_2$, the port $26_3$ and a port $26_4$ and is effective to combine and transfer signals fed to ports $26_2$, $26_3$ to port $26_1$ with port $26_4$ being the uncoupled port. A terminating resistor 25 is connected between the port $26_4$ and ground to terminate the port $26_4$. The port $26_1$ of the coupler 26 is connected to the port $10_3$ of the module 10 which is connected to the receiver 16.

The port $10_4$ is connected to a port $28_1$ of the coupler 28 which is also a four port quadrature hybrid coupler having the port $28_1$, a port $28_2$, a port $28_3$ and a port $28_4$. The coupler 28 is effective to transfer entirely and equally, signals from the port $28_1$ to the ports $28_2$, $28_3$ with the respective signals at the ports $28_2$, $28_3$ being 90 degrees out of phase with each other (i.e. in quadrature with each other). The port $28_4$ is the uncoupled port. A terminating resistor 27 is connected between the port $28_4$ and ground to terminate the port $28_4$. The port $28_2$ is connected to an input of the power amplifier 30 having an output connected to the port $38_4$ of the switching network 38. The port $28_3$ is connected to an input of the power amplifier 32 having an output connected to the port $40_4$ of the switching network 40. As described hereinabove, when the switching network 38 is in the first mode, the port $38_4$ is coupled to the port $38_3$ and when the switching network 40 is in the first mode, the port $40_4$ is coupled to the port $40_3$. The port $38_3$ is connected to a port $24_3$ of the coupler 24. The port $40_3$ is connected to a port $24_2$ of the coupler 24. The coupler 24, a four port quadrature hybrid coupler, includes a first port $24_1$, the port $24_2$, the port $24_3$ and a port $24_4$. The coupler 24 is adapted to combine and transfer signals from the ports $24_2$, $24_3$ to the port $24_1$ with the port $24_4$ being the uncoupled port. The coupler 24 is further adapted, alternatively, to transfer entirely and equally, signals from the port $24_1$ to the ports $24_2$, $24_3$ with the respective signals at the ports $24_2$, $24_3$ being 90 degrees out of phase with each other (i.e. in quadrature with each other). A terminating resistor 23 is connected between the port $24_4$ and ground to terminate the port $24_4$. The port $24_1$ is connected to the port $10_2$ of the module 10.

It should now be apparent, if the switching network 38 and the switching network 40 are in the first mode, then a received signal from the vertical polarized antenna 12 is coupled to the coupler 22 wherein a portion of the received signal is fed to the switching network 38 and another portion of the received signal is fed to the switching network 40. It should be appreciated that the portion of the received signal fed to the switching network 38 has a phase in phase quadrature (i.e. a difference of 90 degrees) with the phase of the other portion of the received signal fed to the switching network 40. With the switching network 38 in the first mode, the portion of the received signal is coupled, via port $38_2$ and the limiter 33, to the input of the low noise amplifier 34. With the switching network 40 in the first mode, the other portion of the received signal is coupled, via port $40_2$ and the limiter 35, to the input of the low noise amplifier 36. The low noise amplifiers 34, 36 are effective to amplify a signal fed to an input thereof and to provide an amplified signal at an output thereof. The amplified signal at the output of the amplifier 34 is fed to the port $26_2$ of the coupler 26. The amplified signal at the output of the amplifier 36 is fed to the port $26_3$ of the coupler 26. It should be appreciated that if the signal path between port $22_3$ and port $26_2$ is similar to the signal path between port $22_2$ and port $26_3$ and whereas the phase of the signal at port $22_2$ is in quadrature with the phase of the signal at port $22_3$, then the phase of the signal at the port $26_2$ is in quadrature with the phase of the signal at the port $26_3$. With a 90 degree shift in phase introduced by coupler 26, the signals at port $26_1$ will constructively add (i.e. have a zero degree difference in phase) with each other and the signals at port $26_4$ will destructively add (i.e. have a 180 degree difference in phase) with each other. The resultant combined signal at port $26_1$ of the coupler 26 is fed to the receiver 16 via port $10_3$ of the module 10. Any residual signal at port $26_4$ is terminated by terminating resistor 25.

The low noise amplifier 34 and the low noise amplifier 36 are a pair of identical amplifiers and when used with the coupler 22 and the coupler 26 as just described provide a balanced low noise amplifier as is familiar with one who is skilled in the art, but in the present embodiment having in addition the switching networks 38, 40.

A transmitted signal from the transmitter 18 is fed, via port $10_4$, to the port $28_1$ of the coupler 28 wherein a portion of the transmitted signal is fed to the power amplifier 30 and another portion of the transmitted signal is fed to the power amplifier 32. It should be appreciated that the portion of the transmitted signal fed to the power amplifier 30 has a phase in phase quadrature (i.e. a difference of 90 degrees) with the phase of the other portion of the transmitted signal fed to the power amplifier 32. The power amplifier 30 and the power amplifier 32 are a pair of identical power amplifiers. The power amplifiers 30, 32 are effective to amplify a signal fed to an input thereof and to provide an amplified signal at an output thereof. The amplified signal at the output of the power amplifier 30 is fed to the port $38_4$ of the switching network 38. The amplified signal at the output of the power amplifier 32 is fed to the port $40_4$ of the switching network 40. With the switching network 38 in the first mode, a portion of the transmitted signal is coupled to the port $24_3$ of the coupler 24 via port $38_3$. With the switching network 40 in the first mode, the other portion of the transmitted signal is coupled to the port $24_2$ of the coupler 24 via port $40_3$. It should be appreciated that if the signal path between port $28_2$ and port $24_3$ is similar to the signal path between port $28_3$ and port $24_2$ and whereas the phase of the signal at port $28_2$ is in quadrature with the phase of the signal at port $28_3$, then the phase of the signal at the port $24_3$ is in quadrature with the phase of the signal at the port $24_2$. With a 90 degree shift in phase introduced by coupler 24, the signals at port $24_1$ will constructively add (i.e. have a zero degree difference in phase) with each other and the signals at port $24_4$ will destructively add (i.e. have a 180 degree difference in phase) with each other. The resultant combined signal at port $24_1$ of the coupler 24 is fed to the horizontal polarized antenna 14 via port $10_2$ of the module 10. Any residual signal at port $24_4$ is terminated by terminating resistor 23.

The power amplifier 30 and the power amplifier 32 when used with the coupler 28 and the coupler 24 as just described provide a balanced power amplifier as is familiar with one who is skilled in the art, but in the present embodiment having in addition the switching networks 38, 40. It should be noted when the power amplifier 30 and the power amplifier 32 are turned off, any power reflected from the power amplifiers 30, 32 are combined and fed to port $28_4$ of the coupler 24 and terminated by the resistor 27. Also any signals that are captured by antenna 14 and coupled to ports $24_3$ and $24_2$ are reflected and combined at port $24_4$ which are then terminated by terminating resistor 23. The latter reduces the amount of RF reflection at the antenna to reduce radar cross section. Furthermore, with half of the transmitted signal fed to the switching network 38 and half of the transmitted signal fed to the switching network 40, the total power handling capability of the module 10 is greater than the power handling capability of each of the switching networks 38, 40.

If the switching network 38 and the switching network 40 are in the second mode, a transmitted signal from the transmitter 18 is fed, via port $10_4$, to the port $28_1$ of the coupler 28 wherein a portion of the transmitted signal is fed to the power amplifier 30 and another portion of the transmitted signal is fed to the power amplifier 32. The amplified signal at the output of the power amplifier 30 is fed to the port $38_4$ of the switching network 38. The amplified signal at the output of the power amplifier 32 is fed to the port $40_4$ of the switching network 40. With the switching network 38 in the second mode, the portion of the transmitted signal at port $38_4$ is coupled, via port $38_1$, to the port $22_3$ of the coupler 22. With the switching network 40 in the second mode, the other portion of the transmitted signal at port $40_4$ is coupled, via port $40_1$, to the port $22_2$ of the coupler 22. Again it should be appreciated that if the signal path between port $28_2$ and port $22_3$ is similar to the signal path between port $28_3$ and port $22_2$ and whereas the phase of the signal at port $28_2$ is in quadrature with the phase of the signal at port $28_3$, then the phase of the signal at the port $22_3$ is in quadrature with the phase of the signal at the port $22_2$. With a 90 degree shift in phase introduced by coupler 22, the signals at port $22_1$ will constructively add (i.e. have a zero degree difference in phase) with each other and the signals at port $22_4$ will destructively add (i.e. have a 180 degree difference in phase) with each other. The resultant combined signal at port $22_1$ of the coupler 22 is fed to the vertical polarized antenna 12 via port $10_1$ of the module 10. Any residual signal at port $22_4$ is terminated by terminating resistor 21.

With the switching network 38 and the switching network 40 in the second mode, a received signal from the horizontal polarized antenna 14 is coupled to the coupler 24 wherein a portion of the received signal is fed to the switching network 38 and another portion of the received signal is fed to the switching network 40. It should be appreciated that the portion of the received signal fed to the switching network 38 has a phase in phase quadrature (i.e. a difference of 90 degrees) with the phase of the other portion of the received signal fed to the switching network 40. With the switching network 38 in the second mode, a portion of the received signal is coupled, via port $38_2$ and limiter 33 to the input of the low noise amplifier 34. With the switching network 40 in the second mode, the other portion of the received signal is coupled, via port $40_2$ and limiter 35, to the input of the low noise amplifier 36. The amplified signal at the output of the amplifier 34 is fed to the port $26_2$ of the coupler 26. The amplified signal at the output of the amplifier 36 is fed to the port $26_3$ of the coupler 26. Again, it should be appreciated that if the signal path between port $24_3$ and port $26_2$ is similar to the signal path between port $24_2$ and port $26_3$ and whereas the phase of the signal at port $24_2$ is in quadrature with the phase of the signal at port $24_3$, then the phase of the signal at the port $26_2$ is in quadrature with the phase of the signal at the port 263. With a 90 degree shift in phase introduced by coupler 26, the signals at port $26_1$ will constructively add (i.e. have a zero degree difference in phase) with each other and the signals at port $26_4$ will destructively add (i.e. have a 180 degree difference in phase) with each other. The resultant combined signal at port $26_1$ of the coupler 26 is fed to the receiver 16 via port $10_3$ of the module 10.

The switching network 38, here, includes a first plurality of RF propagation networks 38a, 38b, 38c disposed in series between the first port $38_1$ and the second port $38_2$ of the switching network 38, a second plurality of RF propagation networks 38d, 38e, 38f disposed in series between the second port $38_2$ and the third port $38_3$ of the switching network 38, a third plurality of RF propagation networks 38g, 38h, 38f disposed in series between the third port $38_3$ and the fourth port $38_4$ of the switching network 38 and a fourth plurality of RF propagation networks 38j, 38k, 38l disposed in series between the fourth port $38_4$ and the first port $38_1$ of the switching network 38. A plurality of field effect transistors are provided, responsive to a control signal, for selectively providing an RF signal path from a junction between adjacent RF propagation networks to ground. The latter couples and decouples connectivity between the port $38_1$ and the port $38_2$ or the port $38_1$ and the port $38_4$ and the port $38_3$ and the port $38_4$ or the port $38_3$ and the port $38_2$. It should be appreciated that the first plurality of RF propagation networks 38a . . . 38c between port $38_1$ and port $38_2$ with field effect transistors disposed between the junction between adjacent RF propagation networks and ground provides an arrangement similar to a single pole single throw switch using shunt connected FETs commonly used in microwave devices.

The signal path from port $38_1$ to port $38_2$ of the switching network 38 includes the plurality of RF propagation networks 38a, 38b and 38c. A field effect transistor FET1 and a field effect transistor FET2 is connected to a junction between adjacent RF propagation networks 38a and 38b and a junction between adjacent RF propagation networks 38b and 38c, respectively, with each transistor having a gate, a source and a drain electrode. The transistor FET1 is disposed with the drain electrode coupled to the junction between adjacent RF propagation networks 38a and 38b and the source electrode is coupled to a ground. The gate electrode is coupled to biasing circuitry 37. In a similar manner, the transistor FET2 is disposed with the drain electrode coupled to the junction between adjacent RF propagation networks 38b and 38c and the source electrode is coupled to the ground. The gate electrode is coupled to biasing circuitry 37.

To provide the signal path between ports $38_1$ and $38_2$ with a relatively low insertion loss characteristic, a first voltage potential is provided to the gate electrodes to place the transistors FET1 and FET2 in a non-conductive state. Thus a signal path having a minimum insertion loss characteristic to RF signals fed thereto is provided between the port $38_1$ and the port $38_2$. To provide the signal path between ports $38_1$ and $38_2$ with a relatively high insertion loss characteristic, a voltage potential is provided to the gate electrodes to place the transistors FET1, FET2 in a conductive state. In their conductive states, the transistors FET1, FET2 provide a low RF impedance path to ground. Consequently, the signal path between ports $38_1$ and $38_2$ provides a maximum impedance mismatch and thus a maximum insertion loss characteristic between the port $38_1$ and the port $38_2$.

In a similar manner, the signal path between ports $38_2$ and $38_3$, the signal path between ports $38_3$ and $38_4$ and the signal path between ports $38_4$ and $38_1$ is provided with a low insertion loss characteristic or alternatively with a high insertion loss characteristic by changing the voltage potential provided to respective gate electrodes to place the respective transistors in a non-conductive state or a conductive state, respectively.

It should be noted that the switching network 38 and similarly the switching network 40 may be provided as an integrated circuit having a plurality of transistors arranged using any technique known to those of skill in the art to provide a transfer switch having isolation characteristics as just described.

In operation, the switching network 38 in the first mode provides an RF connection having a relatively low insertion loss characteristic between the port $38_1$ and the port $38_2$ and a relatively low insertion loss characteristic between the port $38_3$ and the port $38_4$. The switching network 38 also in the first mode provides a relatively high insertion loss characteristic between the port $38_1$ and the port $38_4$ and a relatively high insertion loss characteristic between the port $38_3$ and the port $38_2$.

In operation, the switching network 38 in the second mode provides an RF connection having a relatively low insertion loss characteristic between the port $38_1$ and the port $38_4$ and a relatively low insertion loss characteristic between the port $38_3$ and the port $38_2$. The switching network 38 also in the second mode provides a relatively high insertion loss characteristic between the port $38_1$ and the port $38_2$ and a relatively high insertion loss characteristic between the port $38_3$ and the port $38_4$.

When the switching network 38 is in the first mode providing the RF connection between the port $38_1$ and the port $38_2$, a signal fed from the coupler 22 is coupled to the low noise amplifier 34 and when the switching network 38 is in the first mode providing the RF connection between the port $38_3$ and the port $38_4$, a signal fed from the power amplifier 30 is coupled to the coupler 24. Alternatively, when the switching network 38 is in the second mode providing the RF connection between the port $38_1$ and the port $38_4$, a signal fed from the power amplifier 30 is coupled to the coupler 22 and when the switching network 38 is in the second mode providing the RF connection between the port $38_3$ and the port $38_2$, a signal fed from the coupler 24 is coupled to the low noise amplifier 34.

The biasing circuitry 37 provides an appropriate voltage potential to each of the gate electrodes of the transistors to place the transistors either in a conductive state or a non-conductive state as required. A controller 20 provides a control voltage (i.e. signal) to the biasing circuitry 37 to select either the first mode of operation or the second mode of operation for the switching network 38 as desired.

It should be appreciated that although switching network 38 was here described with three RF propagation networks having shunt FETs connected to ground between the ports, alternatively the number of RF propagation networks and the number of shunt FETs can be varied depending upon the power handling capability and the amount of isolation required. Furthermore, FETs in series with the RF propagation networks or a combination of FETs in series with FETs in shunt with the RF propagation networks could be used to provide the required switching network.

It should now be appreciated that the switching network 40 operates in a manner similar to the switching network 38 and a detailed discussion of the operation of the switching network 40 is not necessary. Suffice to say that biasing circuitry 39 provides an appropriate voltage potential to each of the gate electrodes of the transistors to place the transistors either in a conductive state or a non-conductive state as required. The controller 20 provides a control voltage (i.e. signal) to the biasing circuitry 39 to select either the first mode of operation or the second mode of operation for the switching network 40 as desired.

Figure 2:
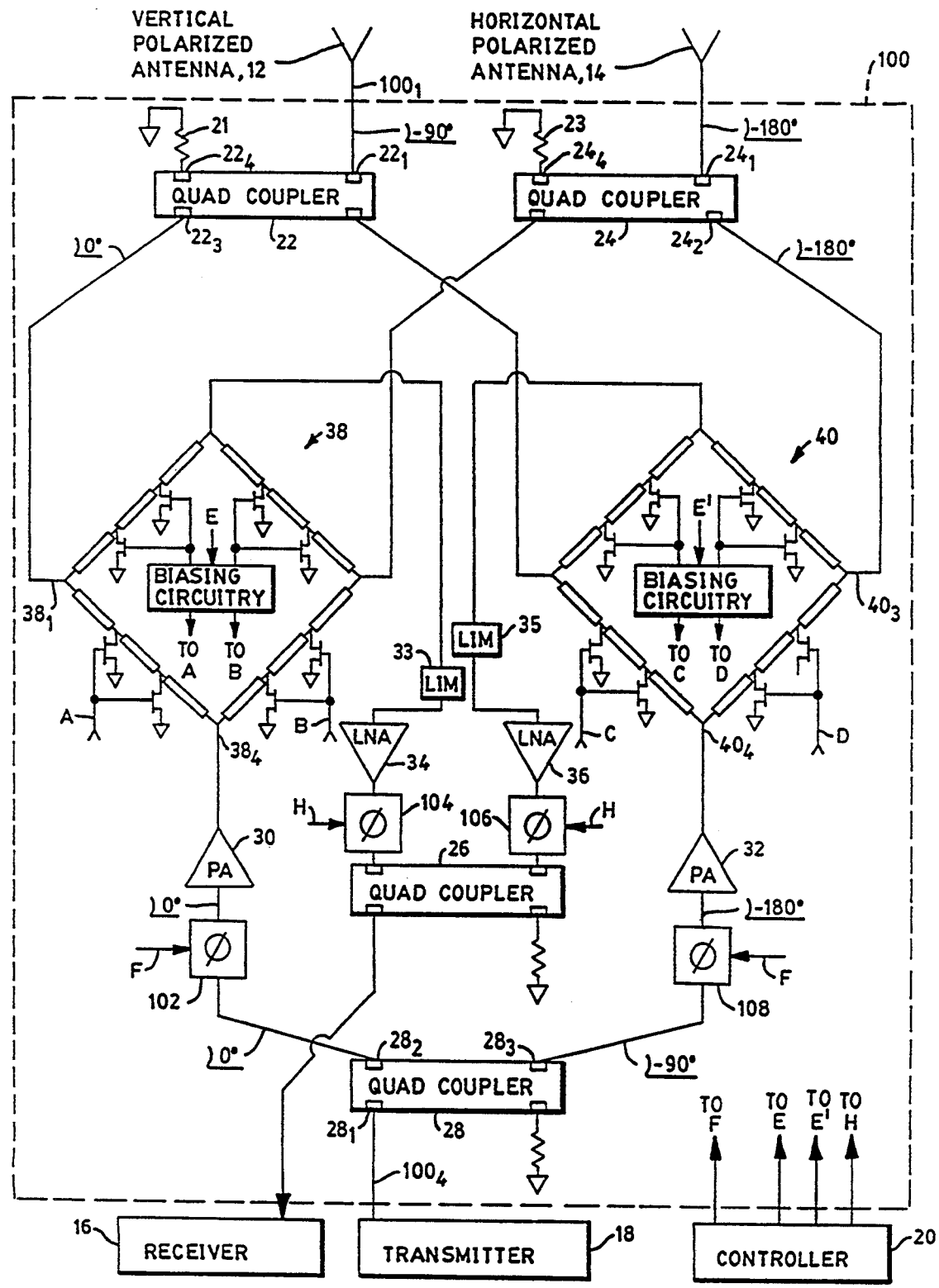
FIG. 2 is a block diagram of an alternative embodiment of a transmit and receive module according to the invention.

Referring now to FIG. 2, an alternative embodiment of a transmit and receive module 100 (hereinafter referred to as module 100) is shown wherein the addition of switchable 90 degree phase shifters 102, 104, 106 and 108 to the module 10 as described in FIG. 1 provide a circular polarization capability. A transmitted signal from the transmitter 18 is fed, via port $100_4$, to the port $28_1$ of the coupler 28 wherein a portion of the transmitted signal is fed to the phase shifter 102 and another portion of the transmitted signal is fed to the phase shifter 108. It should be appreciated that the phase of the signal at the input of the phase shifter 108 lags the phase of the signal of the signal at the input of the phase shifter 102 by 90 degrees. With the phase shifter 102 set to impart a zero degree phase shift to a signal propagating therethrough and the phase shifter 108 set to impart a $-90$ degree phase shift to a signal propagating therethrough, then the signal at the output of the phase shifter 108 will have a phase that lags the phase of the signal at the output of the phase shifter 102 by 180 degrees. The signal at the output of the phase shifter 102 is fed via the power amplifier 30 to the port $38_4$ of the switching network 38. The signal at the output of the phase shifter 108 is fed via the power amplifier 32 to the port $40_4$ of the switching network 40. With the switching network 38 in the second mode (as described hereinabove in connection with FIG. 1), the portion of the transmitted signal at port $38_4$ is coupled to the port $22_3$ of the coupler 22 via port $38_1$. With the switching network 40 in the first mode (as described hereinabove in connection with FIG. 1), the other portion of the transmitted signal at port $40_4$ is coupled to the port $24_2$ of the coupler 24 via port $40_3$. It should be appreciated that if the signal path between port $28_2$ and port $22_3$ is similar to the signal path between port $28_3$ and port $24_2$ and whereas the phase of the signal at the output of phase shifter 102 is 180 degrees out of phase with the signal at the output of phase shifter 108, then the phase of the signal at the port $22_3$ is 180 degrees out of phase with the signal at the port $24_2$. With a 90 degree shift in phase introduced by coupler 22, the signal at port $22_1$ will lag the signal fed to port $22_3$ by 90 degrees. The resultant signal at port $22_1$ of the coupler 22 is fed to the vertical polarized antenna 12 via port $100_1$ of the module 100. Whereas the signal fed to coupler 24 is fed to port $24_2$, the coupler 24 introduces no phase shift to the signal and the signal at the port $24_1$ is 180 degrees out of phase with the signal fed to port $22_3$ of the coupler 22. The 90 degree phase shifters 102, 108 are set so that the horizontal polarized antenna 14 is fed a signal having a 90 degree phase lag with respect to the signal fed to the vertical polarized antenna 12 in order to obtain a right hand circular polarization signal. By switching the switching networks 38, 40 to their respective alternate state (i.e. switching switching network 38 to the first mode and switching switching network 40 to the second mode), the relative phase of the signals fed to the vertical polarized antenna 12 and the horizontal polarized antenna 14 are reversed resulting in a left handed circular polarization signal. In a similar manner, by setting the phase shifters 104, 106 accordingly, right and left handed circular polarization signals can be received and fed to the receiver 16. When transmitting, it should be apparent that a portion of the signal is coupled to terminating resistor 21 via port $22_4$ and to terminating resistor 23 via port $24_4$.

It should also be noted by reversing the connections to the antenna and the terminating resistor at one of the couplers 22, 24, a similar capability for circular and switched linear polarization may be obtained by using 180 degree phase shifters instead of 90 degree phase shifters.

A transmit and receive module as just described provides means within the module for switching between two orthogonal linear polarization ports and right and left hand circular polarization ports for both transmission and reflection while maintaining very low RF reflections from the module at antenna ports.

Figure 3:
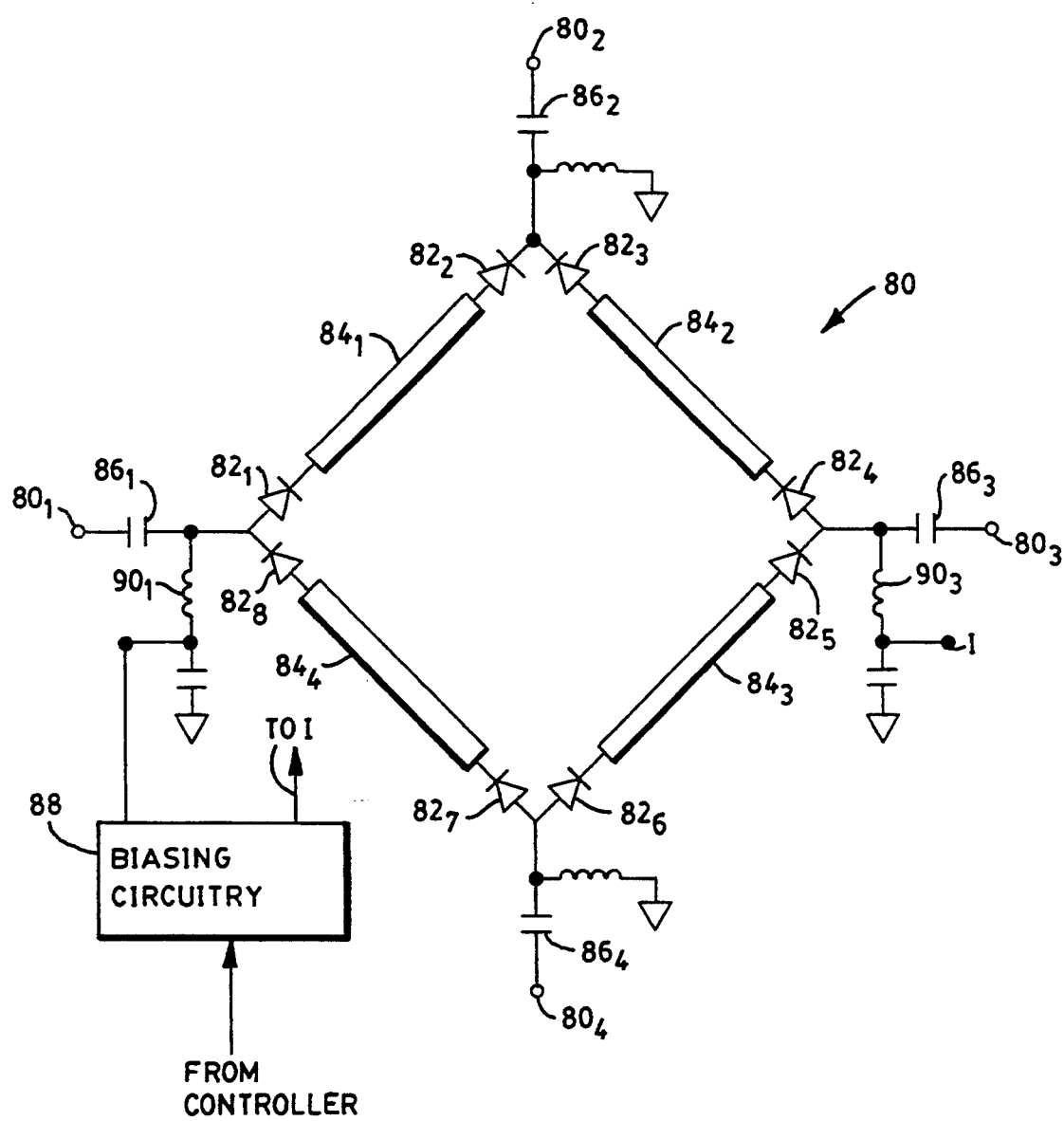
FIG. 3 is a diagram of an alternative switch which can be used in the module of FIG. 1 and FIG. 2.

Referring now to FIG. 3, an alternative switching network 80 shall be described which can be used in place of the switching networks 38, 40 of FIGS. 1 and 2. The switching network 80 includes a port $80_1$, a port $80_2$, a port $80_3$ and a port $80_4$ which correspond respectively with the port $40_1$, the port $40_2$, the port $40_3$ and the port $40_4$ of the switching network 40. The switching network 80 includes a plurality of pin diodes $82_1$, $82_2$, $82_3$, $82_4$, $82_5$, $82_6$, $82_7$ and $82_8$ and a plurality of RF propagation networks $84_1$, $84_2$, $84_3$ and $84_4$ disposed as shown. DC blocking capacitors $86_1$, $86_2$, $86_3$ and $86_4$ are disposed as shown to block the DC bias signal, but allow the RF energy to pass as described hereinabove. To put the switching network 80 in the first mode, biasing circuitry 88 feeds a bias signal, via inductors $90_1$, $90_3$, to bias the plurality of pin diodes $82_1$ ... $82_8$ such that pin diodes $82_1$, $82_2$, $82_5$ and $82_6$ are in a conducting state and pin diodes $82_3$, $82_4$, $82_7$ and $82_8$ are in a nonconducting state. The latter is effective to connect the port $80_1$ with the port $80_2$ and the port $80_3$ with the port $80_4$. To put the switching network 80 in the second mode, biasing circuitry 88 feeds a bias signal, via inductors $90_1$, $90_3$, to bias the plurality of pin diodes $82_1$ ... $82_8$ such that pin diodes $82_1$, $82_2$, $82_5$ and $82_6$ are in a nonconducting state and pin diodes $82_3$, $82_4$, $82_7$ and $82_8$ are in a conducting state. The latter is effective to connect the port $80_1$ with the port $80_4$ and the port $80_3$ with the port $80_2$. With such an arrangement, an alternative technique for switching RF signals is provided.

Having described this invention, it will now be apparent to one of skill in the art that various modifications could be made thereto without affecting this invention. It is felt, therefore, that this invention should not be restricted to its disclosed embodiment, but rather should be limited only by the spirit and scope of the appended claims.

What is claimed is:

1. A transmit and receive module comprising means, having a first pair of ports and a second pair of ports, for connecting signals fed to one of the first pair of ports to one of the second pair of ports and for connecting signals fed to the other one of the second pair of ports to the other one of the first pair of ports, said connecting means comprising:
   (a) a first quadrature hybrid coupler having a first, a second, a third and a fourth port, the first port being one of the first pair of ports of the connecting means;
   (b) a second quadrature hybrid coupler having a first, a second, a third and a fourth port, the first port being the other one of the first pair of ports of the connecting means;
   (c) a third quadrature hybrid coupler having a first, a second, a third and a fourth port, the first port being one of the second pair of ports of the connecting means;
   (d) a fourth quadrature hybrid coupler having a first, a second, a third and a fourth port, the first port being the other one of the second pair of ports of the connecting means; and
   (e) means, responsive to a control signal, for coupling the second and third port of the first quadrature hybrid coupler to the third and second port, respectively, of the third quadrature hybrid coupler and, alternatively, to the third and second port, respectively, of the fourth quadrature hybrid coupler and for coupling the second and third port of the second quadrature hybrid coupler to the third and second port, respectively, of the third quadrature hybrid coupler and, alternatively, to the third and second port, respectively, of the fourth quadrature hybrid coupler.

2. The transmit and receive module as recited in claim 1 wherein the coupling means comprises switching means, having a first, a second, a third and a fourth port, for coupling the first port of the switching means to the second port of the switching means and the third port of the switching means to the fourth port of the switching means and, alternatively, for coupling the first port of the switching means to the fourth port of the switching means and the third port of the switching means to the second port of the switching means, the first port of the switching means coupled to the third port of the first quadrature hybrid coupler.

3. The transmit and receive module as recited in claim 2 wherein the coupling means comprises second switching means, having a first, a second, a third and a fourth port, for coupling the first port of the second switching means to the second port of the second switching means and the third port of the second switching means to the fourth port of the second switching means and, alternatively, for coupling the first port of the second switching means to the fourth port of the second switching means and the third port of the second switching means to the second port of the second switching means, the first port of the second switching means coupled to the second port of the first quadrature hybrid coupler.

4. The transmit and receive module as recited in claim 3 wherein the coupling means comprises:
   (a) a first low noise amplifier disposed between the second port of the first switching means and the second port of the third quadrature hybrid coupler; and
   (b) a second low noise amplifier disposed between the second port of the second switching means and the third port of the third quadrature hybrid coupler.

5. The transmit and receive module as recited in claim 4 wherein the coupling means comprises:
   (a) a first power amplifier disposed between the fourth port of the first switching means and the second port of the fourth quadrature hybrid coupler; and
   (b) a second power amplifier disposed between the fourth port of the second switching means and the third port of the fourth quadrature hybrid coupler.

6. The transmit and receive module as recited in claim 2 wherein the switching means comprises:
   (a) a first plurality of RF propagation networks disposed in series between the first port and the second port of the switching means;
   (b) a second plurality of RF propagation networks disposed in series between the second port and the third port of the switching means;
   (c) a third plurality of RF propagation networks disposed in series between the third port and the fourth port of the switching means;
   (d) a fourth plurality of RF propagation networks disposed in series between the fourth port and the first port of the switching means; and
   (e) means, responsive to the control signal, for selectively providing a RF signal path from a junction between adjacent RF propagation networks to ground.

7. The transmit and receive module as recited in claim 3 wherein the second switching means comprises:
   (a) a first plurality of RF propagation networks disposed in series between the first port and the second port of the second switching means;
   (b) a second plurality of RF propagation networks disposed in series between the second port and the third port of the second switching means;
   (c) a third plurality of RF propagation networks disposed in series between the third port and the fourth port of the second switching means;
   (d) a fourth plurality of RF propagation networks disposed in series between the fourth port and the first port of the second switching means; and
   (e) means, responsive to the control signal, for selectively providing a RF signal path from a junction between adjacent RF propagation networks to ground.

8. A microwave switch comprising:
   (a) first means, having a first, a second and a third port, for coupling signals fed to the first port to the second and third port and alternatively coupling signals fed to the second and third port to the first port;
   (b) second means, having a first, a second and a third port, for coupling signals fed to the first port to the second and third port and alternatively coupling signals fed to the second and third port to the first port;
   (c) third means, having a first, a second and a third port, for coupling signals fed to the first port to the second and third port and alternatively coupling signals fed to the second and third port to the first port;
   (d) fourth means, having a first, a second and a third port, for coupling signals fed to the first port to the second and third port and alternatively coupling signals fed to the second and third port to the first port; and (e) fifth means, responsive to a control signal, for coupling the second and third port of the first coupling means to the third and second port, respectively, of the third coupling means and, alternatively, to the third and second port, respectively, of the fourth coupling means and for coupling the second and third port of the second coupling means to the third and second port, respectively, of the third coupling means and, alternatively, to the third and second port, respectively, of the fourth coupling means.

9. The microwave switch as recited in claim 8 wherein the fifth coupling means comprises switching means, having a first, a second, a third and a fourth port, for coupling the first port of the switching means to the second port of the switching means and the third port of the switching means to the fourth port of the switching means and, alternatively, for coupling the first port of the switching means to the fourth port of the switching means and the third port of the switching means to the second port of the switching means, the first port of the switching means coupled to the third port of the first coupling means.

10. The microwave switch as recited in claim 9 wherein the fifth coupling means comprises second switching means, having a first, a second, a third and a fourth port, for coupling the first port of the second switching means to the second port of the second switching means and the third port of the second switching means to the fourth port of the second switching means and, alternatively, for coupling the first port of the second switching means to the fourth port of the second switching means and the third port of the second switching means to the second port of the second switching means, the first port of the second switching means coupled to the second port of the first coupling means.

11. The microwave switch as recited in claim 10 wherein the switching means comprises:
(a) a first plurality of RF propagation networks disposed in series between the first port and the second port of the switching means;
(b) a second plurality of RF propagation networks disposed in series between the second port and the third port of the switching means;
(c) a third plurality of RF propagation networks disposed in series between the third port and the fourth port of the switching means;
(d) a fourth plurality of RF propagation networks disposed in series between the fourth port and the first port of the switching means; and
(e) means, responsive to the control signal, for selectively providing a RF signal path from a junction between adjacent RF propagation networks to ground.

12. The microwave switch as recited in claim 11 wherein the second switching means comprises:
(a) a first plurality of RF propagation networks disposed in series between the first port and the second port of the second switching means;
(b) a second plurality of RF propagation networks disposed in series between the second port and the third port of the second switching means;
(c) a third plurality of RF propagation networks disposed in series between the third port and the fourth port of the second switching means;
(d) a fourth plurality of RF propagation networks disposed in series between the fourth port and the first port of the second switching means; and
(e) means, responsive to the control signal, for selectively providing a RF signal path from a junction between adjacent RF propagation networks to ground.

13. The microwave switch as recited in claim 12 wherein the fifth coupling means comprises:
(a) a first low noise amplifier disposed between the second port of the first switching means and the second port of the third coupling means; and
(b) a second low noise amplifier disposed between the second port of the second switching means and the third port of the third coupling means.

14. The microwave switch as recited in claim 13 wherein the fifth coupling means comprises:
(a) a first power amplifier disposed between the fourth port of the first switching means and the second port of the fourth coupling means; and
(b) a second power amplifier disposed between the fourth port of the second switching means and the third port of the fourth coupling means.

15. An apparatus comprising:
(a) a first quadrature hybrid coupler having a first, a second, a third and a fourth port;
(b) a second quadrature hybrid coupler having a first, a second, a third and a fourth port;
(c) a third quadrature hybrid coupler having a first, a second, a third and a fourth port;
(d) a fourth quadrature hybrid coupler having a first, a second, a third and a fourth port;
(e) first switching means, having a first, a second, a third and a fourth port, for coupling the first port of the first switching means to the second port of the first switching means and the third port of the first switching means to the fourth port of the first switching means and, alternatively, for coupling the first port of the first switching means to the fourth port of the first switching means and the third port of the first switching means to the second port of the first switching means, the first port of the first switching means coupled to the third port of the first quadrature hybrid coupler and the third port of the first switching means coupled to the third port of the second quadrature hybrid coupler; and
(f) second switching means, having a first, a second, a third and a fourth port, for coupling the first port of the second switching means to the second port of the second switching means and the third port of the second switching means to the fourth port of the second switching means and, alternatively, for coupling the first port of the second switching means to the fourth port of the second switching means and the third port of the second switching means to the second port of the second switching means, the first port of the second switching means coupled to the second port of the first quadrature hybrid coupler and the third port of the second switching means coupled to the second port of the second quadrature hybrid coupler.

16. The apparatus as recited in claim 15 comprising:
(a) a first low noise amplifier connected between the second port of the first switching means and the second port of the third quadrature hybrid coupler; and (b) a second low noise amplifier connected between the second port of the second switching means and the third port of the third quadrature hybrid coupler.

17. The apparatus as recited in claim 15 comprising:
(a) a first power amplifier connected between the fourth port of the first switching means and the second port of the fourth quadrature hybrid coupler; and
(b) a second power amplifier connected between the fourth port of the second switching means and the third port of the fourth quadrature hybrid coupler.

18. The apparatus as recited in claim 15 comprising:
(a) a first terminating resistor connected between the fourth port of the first quadrature hybrid coupler and ground; and
(b) a second terminating resistor connected between the fourth port of the second quadrature hybrid coupler and ground.

19. The apparatus as recited in claim 15 comprising:
(a) a first terminating resistor connected between the fourth port of the third quadrature hybrid coupler and ground; and
(b) a second terminating resistor connected between the fourth port of the fourth quadrature hybrid coupler and ground.

* * * * *